B. WALTER.
TIRE.
APPLICATION FILED APR. 17, 1912.
1,050,581.
Patented Jan. 14, 1913.
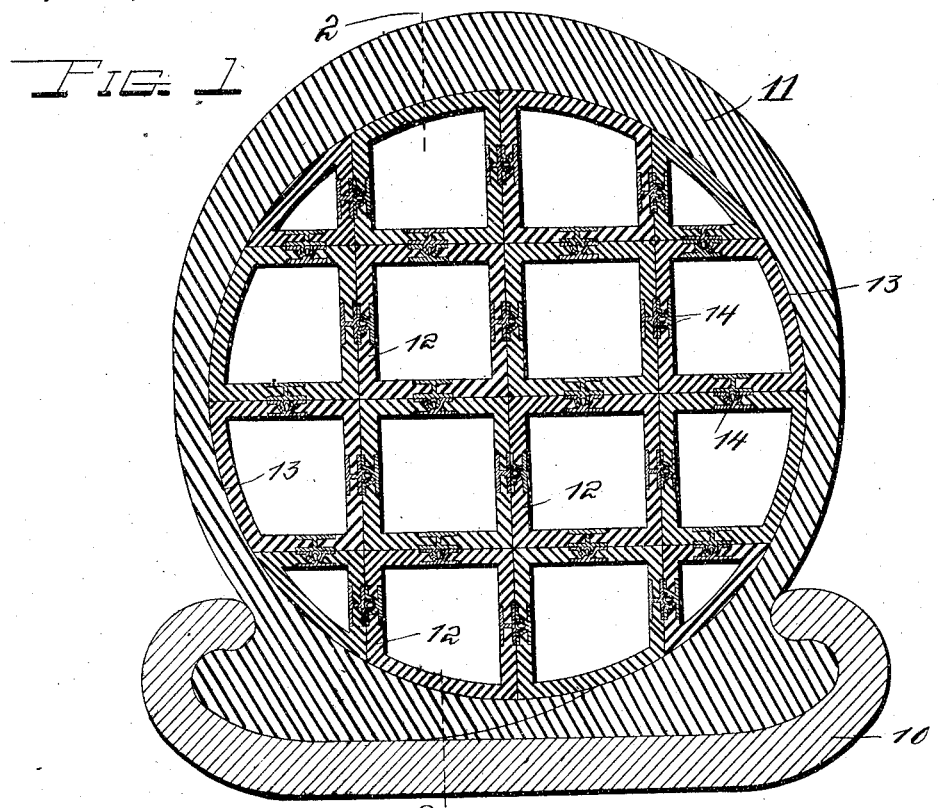
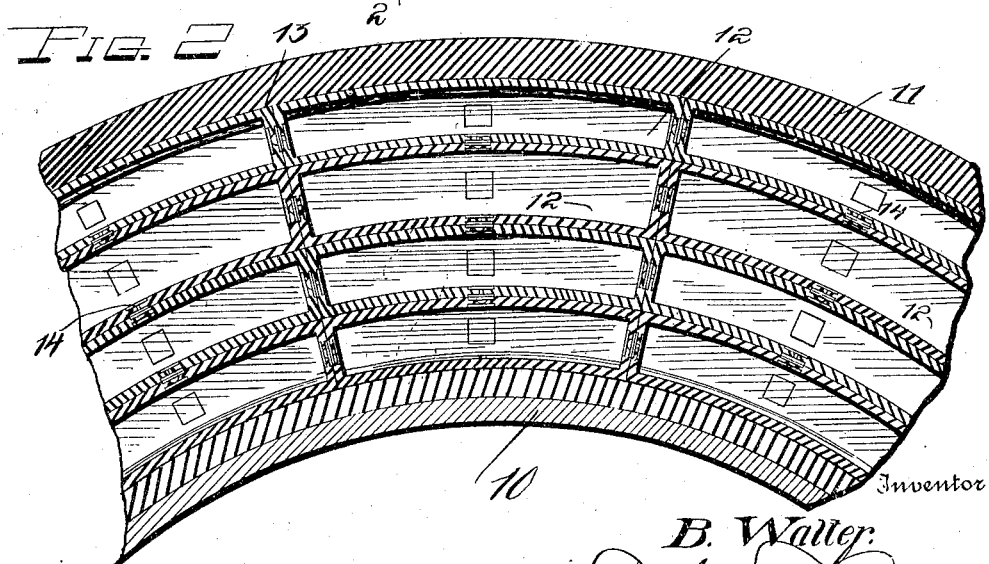
Witnesses
Frank S. Ratcliffe
Henry T. Bright
Inventor
B. Walter.
By 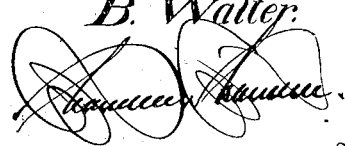
Attorneys

UNITED STATES PATENT OFFICE.

BENJAMIN WALTER, OF LIVERMORE, PENNSYLVANIA.

TIRE.

1,050,581.  Specification of Letters Patent. Patented Jan. 14, 1913.

Application filed April 17, 1912. Serial No. 691,292.

*To all whom it may concern:*

Be it known that I, BENJAMIN WALTER, a citizen of the United States, residing at Livermore, in the county of Westmoreland, State of Pennsylvania, have invented certain new and useful Improvements in Tires; and I do hereby declare the following to be a full, clear, and exact description of the invention, such as will enable others skilled in the art to which it appertains to make and use the same.

This invention relates to tires and particularly to pneumatic tires such as are employed in connection with automobiles and the like.

The object of the invention resides in the provision of a novel tire of this character which includes an outer tube and a plurality of inflated member completely filling the outer tube and having abutting flat faces provided with detachable ball and socket connections therebetween and so arranged that the puncture of one of said tubes will not destroy the usefulness or efficiency of the tire.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a transverse section through a portion of a tire constructed in accordance with the invention, and Fig. 2, a section on the line 2—2 of Fig. 1.

Referring to the drawings 10 indicates the rim of an automobile wheel which has secured thereto in the usual manner the outer casing 11. Disposed within the outer casing 11 is a plurality of inflated members 12 having their abutting faces formed flat and said members completely filling the space within the outer casing 11. These members 12 are arranged in layers and the members in a given layer are disposed end to end. The faces of those members 12 which are disposed next to the inner wall of the outer casing 11 are formed curved as at 13 so as to produce a continuous surface engaging with the inner walls of the outer casing 11. The adjacent flat faces of the members 12 are provided at corresponding points with coöperating elements of a ball and socket joint 14. Through the medium of these elements the members 12 which are inflated during manufacture, may be secured together in assembled relation in an inflated state prior to their insertion in the outer casing 11. It will also be apparent that the connection between adjacent members 12 may be readily released when desired.

From the foregoing construction it will be obvious that there has been provided a pneumatic tire which will permit of continued use and at the same time maintain a high degree of efficiency after being subjected to a puncture that would put an ordinary pneumatic tire out of commission.

What is claimed is:

A tire comprising an outer casing, and a plurality of inflated members completely filling the interior of the outer casing, said members having their abutting faces flat and provided at corresponding points with coöperating elements of a ball and socket joint.

In testimony whereof, I affix my signature in presence of two witnesses.

BENJAMIN WALTER.

Witnesses:
WILLIAM WALTER,
JOS. H. WALTER.